July 11, 1933.  W. A. SCOTT  1,917,777
MOTOR VEHICLE BED ATTACHMENT
Filed Oct. 23, 1931  3 Sheets-Sheet 1

INVENTOR
Wm A. Scott
BY
ATTORNEY

July 11, 1933.  W. A. SCOTT  1,917,777
MOTOR VEHICLE BED ATTACHMENT
Filed Oct. 23, 1931   3 Sheets-Sheet 2
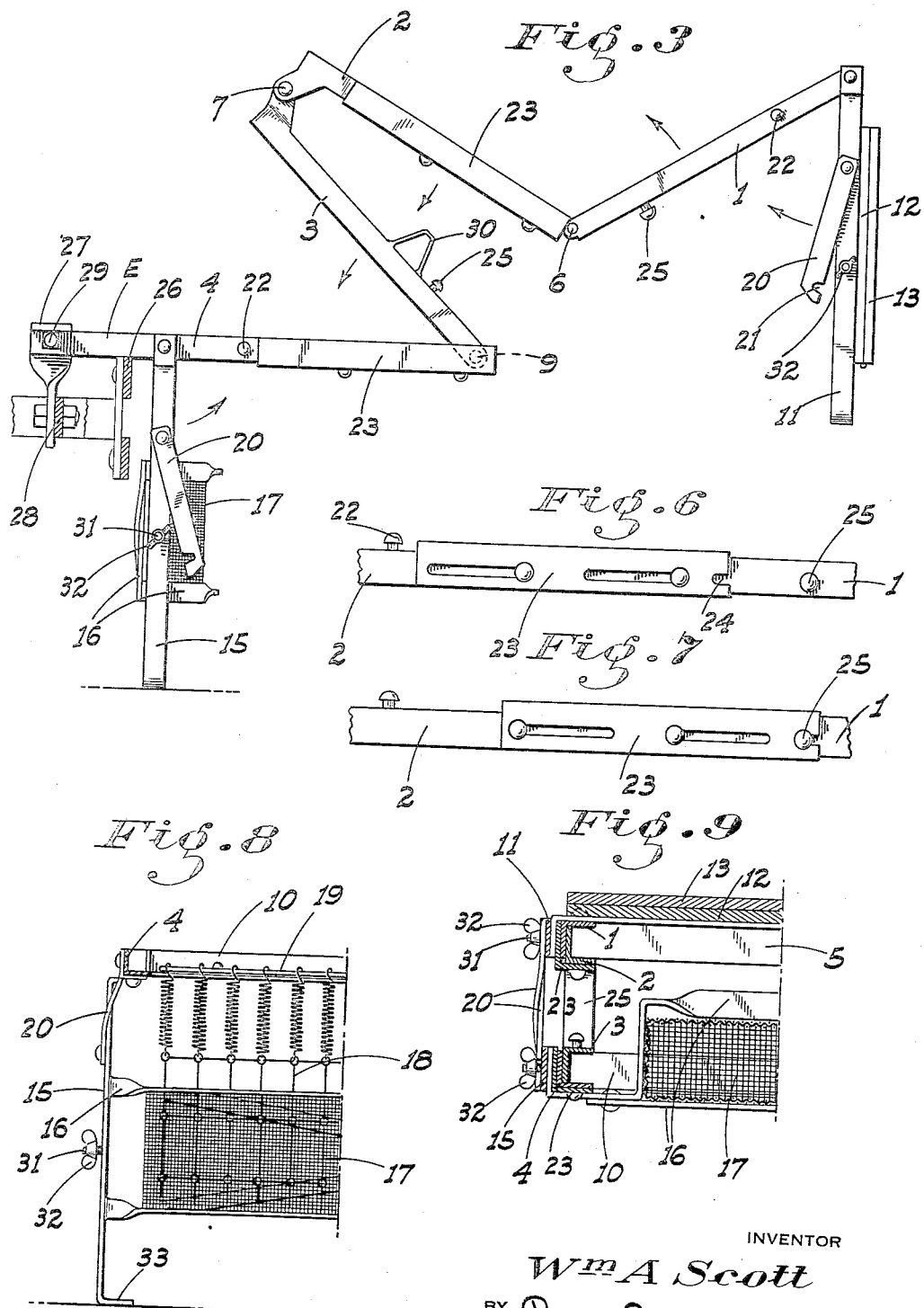
INVENTOR
Wm A Scott
BY
ATTORNEY July 11, 1933.         W. A. SCOTT         1,917,777
MOTOR VEHICLE BED ATTACHMENT
Filed Oct. 23, 1931         3 Sheets-Sheet 3
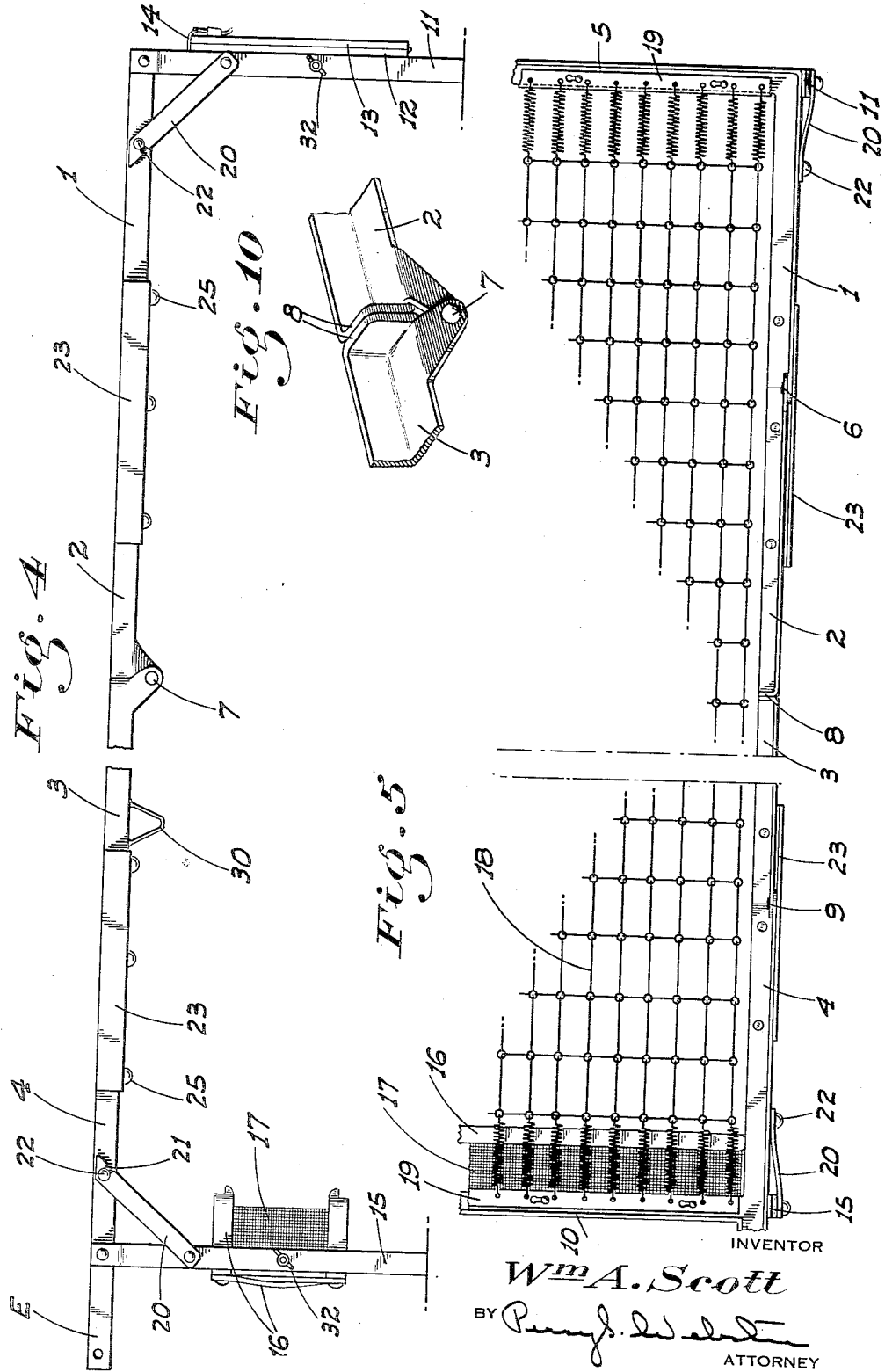

Patented July 11, 1933

1,917,777

UNITED STATES PATENT OFFICE

WILLIAM A. SCOTT, OF LODI, CALIFORNIA

MOTOR VEHICLE BED ATTACHMENT

Application filed October 23, 1931. Serial No. 570,547.

This invention relates to camping equipment for motor vehicles, my principal object being to provide a bed structure adapted to be folded when not in use into a very compact form and arranged to be then mounted on the back of an automobile in such a manner that not only is it out of the way of the occupants of the car but it may then serve as a platform for supporting other pieces of equipment.

The bed structure is also arranged so that when unfolded for use it may remain attached to the vehicle or it may be disconnected therefrom depending on the ground conditions at the camp or the desire of the owner.

Another object of the invention is to provide a table in connection with the bed so arranged that it may be used without unfolding the bed or removing the same from the car. Still another object is to arrange the structure so that it may be unfolded or vice versa in a very short time without the use of any tools.

These objects I accomplish by means of such structure and relative arrangement of parts as will fully appear by a perusal of the following specification and claims.

In the drawings similar characters of reference indicate corresponding parts in the several views:

Fig. 3 is a side elevation of the bed structure partly unfolded.

Fig. 4 is a similar view of the bed fully unfolded and ready for occupancy.

Fig. 5 is a fragmentary top plan of the unfolded bed.

Figs. 6 and 7 are fragmentary bottom plan views of a pair of hinged frame rails showing the sliding brace connection in its retracted and advanced positions respectively.

Fig. 8 is a fragmentary transverse section of the bed unfolded.

Fig. 9 is a fragmentary cross section of the folded bed taken on the line 9—9 of Fig. 1.

Fig. 10 is a perspective view of a hinged connection between adjacent frame rails of the bed.

Figure 1:
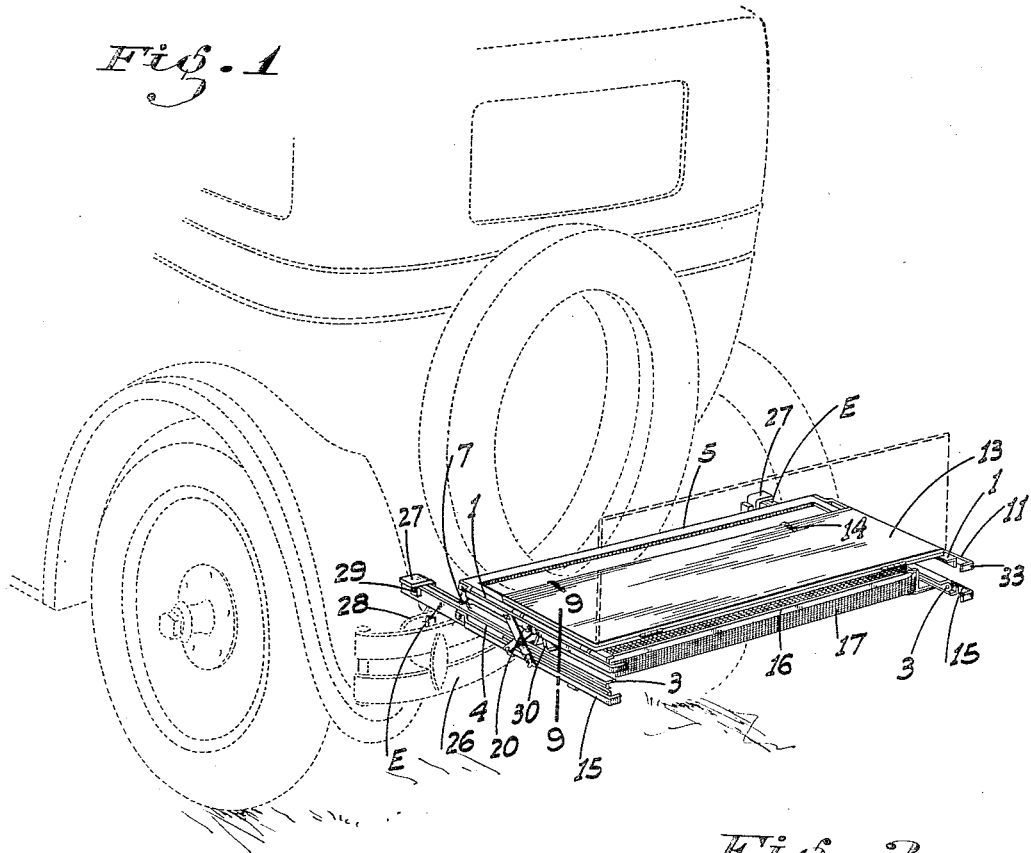
Fig. 1 is a perspective outline of the back of an automobile showing my bed mounted thereon in its folded position.

Referring now more particularly to the characters of reference on the drawings, the bed frame comprises opposed pairs of side rail sections 1, 2, 3 and 4, preferably of angle form and of equal length and whose total length when outstretched determines the length of the bed. The end rails 1 are rigidly connected at their outer ends by a cross rail 5. The adjacent ends of the rails 1 and 2 are hinged together as at 6 for upward folding movement, while the adjacent ends of the rails 2 and 3 are hinged together as at 7 for downward folding movement. The pivot of the hinge 7 is some distance below the bottom line of the rails as shown and upward folding movement between said rails is positively prevented by laterally extending pads 8 at the adjacent ends of the rails above the hinge and engaging each other when the rails are outstretched.

The rails 3 and 4 are hinged together at their adjacent ends as at 9 for upward folding movement and the rails 4 toward their outer ends are rigidly connected by a cross rail 10. The rails 2 and 3 are in direct longitudinal alinement with each other while the side flanges of the end rails 1 and 4 lie outwardly of the corresponding flanges of the rails 2 and 3 as shown in Fig. 5.

Depending from and pivoted on the outer ends of the rails 1 on the outside of the same are legs 11 extending between and connected to which is a table board 12. Another similar board 13 is normally folded against the board 12 and is hinged thereto along the edge nearest the ground when the legs are in their depending position. The boards are normally held from separation at their free edges by any suitable releasable catch device such as straps 14. Other legs 15 are pivoted on and depend from the outside of the rails 4 in alinement with the cross rail 10. These legs are connected together and braced by transversely extending straps 16 which are arranged as pairs spaced lengthwise of the bed. Netting or other covering 17 is mounted in connection with these straps in such a manner as to form a rectangular receptacle open on the top when the legs are in their depending position. This receptacle is of a width and general size sufficient to receive the rolled up or folded spring mattress 18 of the bed. This mattress is connected at its opposite ends to cross members 19 which are detachably connected to the adjacent cross rails 5 in any suitable manner. This arrangement enables the mattress to be disconnected from one end of the bed and placed in the receptacle before the bed structure is folded up so that the mattress then offers no interference with the folding of the bed frame, or completely disconnected from the bed frame and folded up separately as may be most convenient.

The legs when in a vertical depending position are held against folding by diagonal straps 20 pivoted at one end on the legs and provided toward the other end with notches 21 for detachable engagement with headed pins 22 mounted on the adjacent side rails. The hinge connection between the rails 1 and 2 and between the rails 3 and 4 are releasably held from upward folding movement by members 23 slidably mounted in connection with and under the rails 2 and 3; and adapted to be moved lengthwise into overlapping relation with the adjacent ends of the rails 1 and 4. At the corresponding ends the members 23 have relatively long notches 24 adapted to engage under the heads of the pins 25 depending from the rails 1 and 4. The members 23 are also of angle form so as to have the necessary strength against bending without being unduly heavy.

Figure 2:
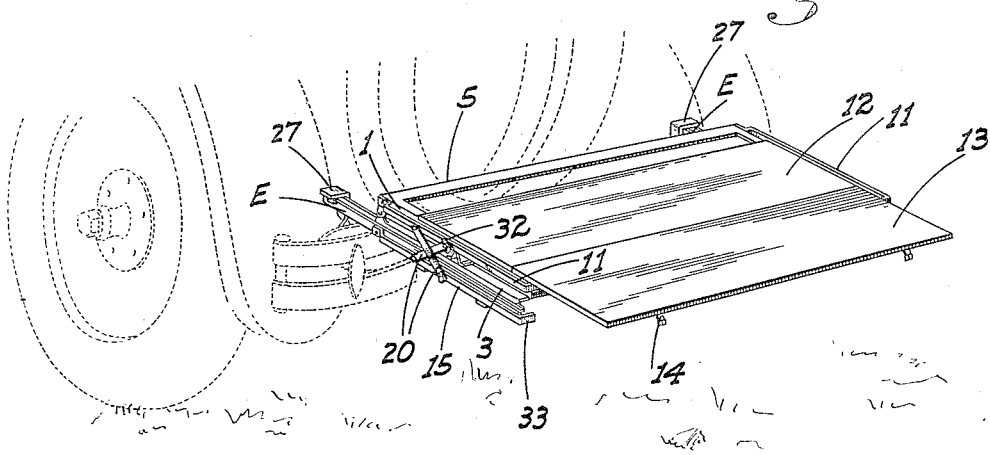
Fig. 2 is a similar view showing the table as in position for use.

The rails 4 are formed with longitudinal extensions E projecting some distance beyond the cross rail 10. These extensions are adapted to rest on the rear bumpers 26 of the car to the sides of the spare tire as shown in Figs. 1 and 2. The extensions at their ends then project under and engage hangers 27 which are rigidly mounted on the supporting bars 28 of the bumper structure; the hangers and extensions having matching holes through which holding bolts 29 may be removably passed. In this manner the attachment is firmly supported from the car without interfering with the spare tire or the removal of the same if necessary without disturbing the bed. It also enables the bed to be unfolded and used without removing it from the car since the legs are made so as to be of the same length as the height from the top of the bumpers to the ground.

When folding the bed when the same is attached to the car the rails 3 are folded into the rails 4, the rails 2 are folded toward the rails 3, and the rails 1 are folded into the rails 2 so that the rails 1 are uppermost. The rails 2 and 3 are held in parallel relationship by spacers 30 mounted on the rails 3 intermediate their ends to engage the rails 2 and compensating for the space therebetween due to the hinge 7. The legs 15 fold up alongside the rails 4 while the legs 11 fold alongside the rails 1. The front cross braces 16 which extend between the legs 15 and which then bend against the rails 4 limit the upward movement of these legs; while the board 12 bears against the rails 1 and limits the downward movement of the legs 11. The mattress receptacle then projects between the folded rails as shown in Fig. 9; there being plenty of space in height between the folded parts for this purpose.

When the rails and legs are thus folded together they are releasably held against separation by the leg braces 20. These leg braces are of course already disengaged from the pins 22 and may now be reengaged with studs 31 on the other legs so that the braces are disposed in cross relation to each other as shown in Fig. 1. The braces are then releasably clamped in place by wing nuts 32 on the studs. The legs are slightly longer than the rail sections on which they are mounted so that the inturning ground engaging feet 32 on the legs do not interfere with the rails when said legs are folded.

When the structure is thus folded the table is uppermost and the hinged board 13 may be swung out to lie in alignment with the board 12 without disturbing any other part of the structure as shown in Fig. 2.

A substantial table of good size and at a usable height from the ground is thus provided. It will also be seen that the table may serve as a platform for the support of suitcases or other pieces of equipment if desired; and that the hinged board 13 may be swung up to lie in a vertical plane to protect such equipment if desired as indicated by dotted lines in Fig. 2.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A folding bed structure comprising a plurality of separate side rail sections, means hingedly connecting said sections for folding movement in successively superimposed order whereby the two end sections of the frame then occupy the top and bottom positions, legs pivoted on the outer ends of the end sections to depend to the ground or to fold alongside said sections, and means between the opposed legs and arranged to function when the legs and the frame sections are folded to hold said legs and sections against unfolding movement.

2. A folding bed structure comprising a plurality of separate side rail sections, means hingedly connecting said sections for folding movement in successively superimposed order whereby the two end sections of the frame then occupy the top and bottom positions, legs pivoted on the outer ends of the end sections to depend to the ground or to fold alongside said sections, means preventing further movement of the legs beyond such folded position, braces pivoted at one end on the legs, disengageable connection means between the other ends of the braces and the adjacent frame sections, and disengageable connection means between the other ends of the braces and the opposed legs adapted to cooperate only when the sections and legs are folded.

3. A bed frame structure including side-rail sections connected together for folding or extending movement, cross rails connecting the outer ends of the endmost rail sections, a flexible spring mattress extending between the cross rails and detachably connected to one cross rail, transverse pairs of legs pivoted on the end sections for depending or folding movement, and a receptacle for the spring mattress extending between and connected to that pair of legs opposite to the end of the frame structure to which said mattress is detachably connected.

4. A bed frame structure including side rail sections connected together for folding or extending movement, means to support the structure in a horizontal position from and outwardly of a motor vehicle a certain height from the ground, a pair of legs mounted in connection with that section which is uppermost when the structure is folded and arranged for depending movement relative to said section or for folding movement alongside the same, and a table extending between and secured to the legs and arranged, when said legs are folded, to rest on said uppermost section in position for use.

5. A structure as in claim 3, in which the receptacle is arranged relative to the legs so that the latter may fold to lie alongside the adjacent side rails on the outside, the receptacle then projecting between said rails.

6. A bed frame structure including side rail sections connected together for superimposed folding or extending movement, means for supporting the structure in a horizontal position from and outwardly of a motor vehicle a certain height from the ground, a table top consisting of two hinged sections, and means mounting one of the top sections in permanent connection with the frame structure and so that when the frame sections are extended, the table top will be clear of the same, and when said sections are folded the mounted top section is supported by the then uppermost frame section toward its outer end and with the other top section uppermost and with its hinged edge facing the outer end of the frame structure.

In testimony whereof I affix my signature.

WILLIAM A. SCOTT.